US010097569B2

(12) United States Patent
Jeong et al.

(10) Patent No.: US 10,097,569 B2
(45) Date of Patent: Oct. 9, 2018

(54) SYSTEM AND METHOD FOR TRACKING MALWARE ROUTE AND BEHAVIOR FOR DEFENDING AGAINST CYBERATTACKS

(71) Applicant: AGENCY FOR DEFENSE DEVELOPMENT, Daejeon (KR)

(72) Inventors: Il-Hoon Jeong, Seoul (KR); Hwa-Seong Lee, Seoul (KR); Chang-Hee Choi, Seoul (KR); Ho-Sang Yun, Seoul (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 194 days.

(21) Appl. No.: 15/273,928

(22) Filed: Sep. 23, 2016

(65) Prior Publication Data

US 2017/0374086 A1    Dec. 28, 2017

(30) Foreign Application Priority Data

Jun. 23, 2016    (KR) .................. 10-2016-0078563

(51) Int. Cl.
*H04L 29/06*    (2006.01)

(52) U.S. Cl.
CPC ........ *H04L 63/1416* (2013.01); *H04L 63/145* (2013.01); *H04L 2463/146* (2013.01)

(58) Field of Classification Search
CPC .................... H04L 63/1416; H04L 63/145
USPC ........................................................ 726/23
See application file for complete search history.

(56) References Cited

U.S. PATENT DOCUMENTS

| 2006/0070130 A1* | 3/2006 | Costea | G06F 21/552 726/24 |
| 2008/0086773 A1* | 4/2008 | Tuvell | G06F 21/55 726/23 |
| 2008/0086776 A1* | 4/2008 | Tuvell | G06F 21/564 726/24 |
| 2014/0013434 A1* | 1/2014 | Ranum | H04L 63/145 726/24 |

(Continued)

FOREIGN PATENT DOCUMENTS

| KR | 2010-0078081 A | 7/2010 |
| KR | 10-1256507 B1 | 4/2013 |

(Continued)

*Primary Examiner* — Michael S McNally
(74) *Attorney, Agent, or Firm* — LRK Patent Law Firm (57) ABSTRACT

An attack tracking system includes multiple hosts in which first event data concerning object behavior are collected and pieces of host-based event information are created therefrom; a tracking information database server storing the pieces of host-based event information; a tracking information analysis server creating behavior events by defining malware behavior from the pieces of host-based event information, retrieving targets to be analyzed from the pieces of host-based event information and the behavior events based on a preset input value, creating first tracking contexts for identifying the malware behavior by analyzing the relationship between the pieces of host-based event information and the relationship between a set of the pieces of host-based event information and a set of the behavior events, and creating second tracking contexts tracking malware routes and behavior events between the multiple hosts by analyzing the correlation between the first tracking contexts.

14 Claims, 9 Drawing Sheets

(56) References Cited

U.S. PATENT DOCUMENTS

2015/0074810 A1* 3/2015 Saher .................. H04L 63/1466
                                                        726/23

FOREIGN PATENT DOCUMENTS

| KR | 2015-0084123 A | 7/2015 |
| KR | 2015-0138988 A | 12/2015 |

* cited by examiner

SYSTEM AND METHOD FOR TRACKING MALWARE ROUTE AND BEHAVIOR FOR DEFENDING AGAINST CYBERATTACKS

CROSS-REFERENCE TO RELATED APPLICATION

This application claims the benefit of priority to Korean Patent Application No. 10-2016-0078563 filed on Jun. 23, 2016, the entire contents of which are incorporated herein by reference.

BACKGROUND OF THE INVENTION

1. Technical Field

The present invention relates generally to technology for defending against cyberattacks and, more particularly, to an attack tracking system and method in which information about intrusions using malware is automatically collected and analyzed, whereby malware routes and behavior are tracked.

2. Description of the Related Art

As cyberattacks are more sophisticated, it is more difficult to analyze and respond to intrusion incidents. Accordingly, organizations cannot appropriately respond to intrusion incidents, which may lead to increased damage or incomplete recovery, which may in turn incur repeated damage.

Measures to respond to intrusion incidents may simply comprise six steps, namely advance preparations, detection of incidents, collection of evidence (information), investigation and analysis, reporting and responding, and preservation of evidence. Here, collection of evidence and investigation and analysis are major steps by which when, by who, and how the incidents occurred are analyzed and how to prevent the spread of damage and the repeat of the incidents is determined. Generally, the collection of evidence and investigation and analysis are performed using digital forensic technology for responding to intrusion incidents.

In regard to the collection of evidence (information), current digital forensic technology is configured such that system artifacts to be used for analysis, such as file systems, registry entries, web browser logs and the like, are collected based on Windows operating systems and analyzed by security specialists. However, because such analysis is performed in such a way that necessary data are collected and analyzed after an incident has taken place, the evidence required for analysis may be intentionally deleted by attackers, or important data may be deleted due to the limited capacity of log storage or the like.

Also, in regard to the collection of evidence (information) and/or investigation and analysis, current digital forensic technology limitedly collects each artifact and/or merely provides all of the collected artifacts, organized into columns in order to see them more easily. In other words, bits are provided in the form by which users can easily read them, but information, such as the interpretation of the meaning of the bits, the correlation of the bits, and the like, is not provided. Therefore, the determination of details such as "when, who, where, what, how, and why" related to an intrusion incident depends largely on the experience and knowledge of security specialists. That is, depending on the ability of security specialists, analysis results may differ, and it is difficult to systematically respond to intrusion incidents.

These days, most cyberattacks performed through malware according to a long-term plan or a short-term plan.

Therefore, what is required is the development of basic infrastructure technology that is systematic and easy to use and is capable of minimizing reliance on security specialists, effectively responding to cyberattacks such as the influx, execution, and propagation of malware, and tracking malware routes and behavior.

Here, malware routes and behavior may be tracked by analyzing information about behavior associated with main system objects (for example, files, processes, registry entries, networks, external storage media and the like), information about parent objects of the objects associated with the behavior, and the relationship between an object and an object event. Here, the behavior associated with the main system objects may include, for example, the creation, deletion, reading and copying of a file, the execution, termination and reading of a process, the reading, writing, and deletion of registry entries, a request for network access and permission therefor, a request for connecting to external storage media and permission therefor, and the like.

Additionally, specific behavior may be tracked by collecting information about certain behavior of malware. Here, information about behavior, such as access by malware to an area in which the malware can hide and the storage of malware in such an area for concealment and maintenance, the change of a configuration in order to enable the malware to be automatically run, and access by malware to a Master Boot Record (MBR) area or a Volume Boot Record (VBR) area in order to cause a system crash, may be collected and used for analysis.

Meanwhile, as techniques for collecting information to be used for analysis, there are techniques for collecting system artifacts for forensic analysis, techniques for collecting information about system objects by hooking system events, and techniques for collecting information about system objects using kernel drivers.

Here, because forensic technology depends on analysts' determinations, it is difficult to automate. Also, hooking techniques may have low security when they are performed in various execution environments, and it is highly probable that they will conflict with another security agent installed in an operating system. Techniques using kernel drivers are disadvantageous in that a lot of time is required for stabilization due to the characteristics thereof.

In other words, because the existing techniques for collecting information to be used for analysis have limitations in the ability to be stably and continuously used to collect information or to be used for automated analysis, the introduction of new techniques by which information to be used for automated analysis for tracking is collected in real time is required. Also, an architecture in which automated analysis may be performed using the object information collected by the new techniques is required.

SUMMARY OF THE INVENTION

Accordingly, the present invention has been made keeping in mind the above problems occurring in the conventional art, and an object of the present invention is to provide a system and method that may track malware routes and behavior in order to defend against cyberattacks.

In order to accomplish the above object, the present invention provides a system for tracking a malware route and behavior in order to defend against cyberattacks.

The system may be configured to include multiple hosts in which first event data concerning object behavior are collected and pieces of host-based event information are created using the first event data; a tracking information database server for storing the pieces of host-based event information therein; and a tracking information analysis server for creating behavior events by defining malware behavior from the pieces of host-based event information, for searching the pieces of host-based event information and the behavior events for a target to be analyzed based on a preset input value, for creating first tracking contexts, through which the malware behavior is capable of being identified, by analyzing a relationship between the pieces of host-based event information and a relationship between a set of the pieces of host-based event information and a set of the behavior events, which correspond to the target to be analyzed, and for creating second tracking contexts, through which a malware route and behavior events between the multiple hosts are capable of being tracked, by analyzing a correlation between the first tracking contexts.

Also, each of the multiple hosts may be configured to include an event-tracking module for tracking the event data; and a tracking information collection module for creating unit event information by collecting the tracked event data.

Also, the tracking information collection module may be configured to include a data collector for creating second event data from the first event data; a data normalization engine for creating normalized data by normalizing the second event data; an information generator for extracting data necessary for tracking from the normalized data and obtaining related additional information from the extracted data, thereby generating information data; and a unit event generator for generating a host-based event by adding information about a host in which an event occurs to the information data.

Also, the additional information may include at least one of parent file information, process information, a file hash value, Internet Protocol (IP) address information, and time information.

Also, the information about the host may include at least one of a Media Access Control (MAC) address and a name of the host.

Also, the malware behavior may be one of an influx of malware, execution of malware, and propagation of malware.

Also, the target to be analyzed may be at least one of the corresponding host, a malware file, and a malware process.

Also, the first tracking contexts may be tracking contexts inside at least one of the multiple hosts, and the second tracking contexts may be tracking contexts between the multiple hosts.

Also, the second tracking contexts may be created by identifying at least one of an entry point via which malware enters a domain, a route via which the malware migrates, and a route via which the malware propagates by analyzing the correlation between the first tracking contexts.

Also, the piece of host-based event information may include at least one of creation of a file, deletion of a file, reading a file, copying a file, a start of a process, termination of a process, reading a process, reading a registry entry, writing data in a registry, deletion of a registry entry, a request for access to a network, permission for access to a network, a request for a connection to an external storage medium, permission for a connection to an external storage medium, writing data in a Master Boot Record (MBR) area, and writing data in a Volume Boot Record (VBR) area, or parent information thereof.

Also, the event-tracking module may be an Event Trace for Windows (ETW), and the pieces of host-based event information may be stored in the tracking information database server in real time whenever a corresponding event occurs.

Also, the first tracking contexts may be created in such a way that a list of hosts suspected of being infected with malware in a domain is acquired; a first behavior event related to the malware behavior, among the pieces of host-based event information and the behavior events for each of the hosts in the list, is identified; and a second behavior event is identified based on a unit/behavior event concerning a main object related to the first behavior event.

Also, the main object may include a file and a process.

Also, at least one of the entry point via which malware enters a domain, a route via which the malware migrates, and a route via which the malware propagates is identified using a collection of Internet Protocol (IP) addresses, which are created as a result of identifying at least one of an influx of malware into a host, execution of malware, and propagation of malware for each host in a list of hosts suspected of being infected with malware or using execution of malware in the domain based on an execution analysis result in the multiple hosts.

Also, if at least one of the entry point via which malware enters the domain, a route via which the malware migrates, and a route via which the malware propagates is not identified using the collection of IP addresses, an additional list of hosts suspected of being infected with malware may be acquired by searching for the behavior events collected inside the domain using a file name that is used for the influx of malware to the host in the list or the propagation of malware, and at least one of the entry point via which malware enters the domain, a route via which the malware migrates, and a route via which the malware propagates may be identified using the additional list, wherein the file name is obtained as an analysis result.

Meanwhile, another embodiment of the present invention may provide a method for tracking a malware route and behavior in order to defend against cyberattacks, the method including collecting, by multiple hosts, first event data concerning object behavior and creating, by the multiple hosts, pieces of host-based event information using the first event data; storing, by the multiple hosts, the pieces of host-based event information in a tracking information database server; creating, by a tracking information analysis server, behavior events by defining malware behavior from the pieces of host-based event information; retrieving, by the tracking information analysis server, a target to be analyzed from the pieces of host-based event information and the behavior events based on a preset input value; creating, by the tracking information analysis server, first tracking contexts, through which the malware behavior is capable of being identified, by analyzing a relationship between the pieces of the host-based event information and a relationship between a set of the pieces of the host-based event information and a set of the behavior events; and creating, by the tracking information analysis server, second tracking contexts, through which a malware route and behavior events between the multiple hosts are capable of being tracked, by analyzing a correlation between the first tracking contexts.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention may be variously changed, and may have various embodiments, and specific embodiments will be described in detail below with reference to the attached drawings. However, it should be understood that those embodiments are not intended to limit the present invention to specific disclosure forms and that they include all changes, equivalents or modifications included in the spirit and scope of the present invention.

The same reference numerals are used to designate the same or similar elements throughout the drawings.

Terms such as "first", "second", and the like may be used to describe various elements, but the elements should not be limited by the terms. The terms are used only to distinguish one element from another element.

For example, without departing from the scope of the present invention, the first element may be referred to as the second element, and similarly, the second element may be referred to as the first element. The term "and/or" may include a combination of multiple related elements or any one of multiple related elements.

Unless differently defined, all terms used here including technical or scientific terms have the same meanings as the terms generally understood by those skilled in the art to which the present invention pertains.

The terms identical to those defined in generally used dictionaries should be interpreted as having meanings identical to contextual meanings in the related art, and are not to be interpreted as having ideal or excessively formal meanings unless they are definitely defined in the present specification.

Hereinafter, an attack tracking system for tracking a malware route and malware behavior in order to defend against cyberattacks according to an embodiment of the present invention will be described in detail with reference to the accompanying drawings.

Figure 1:
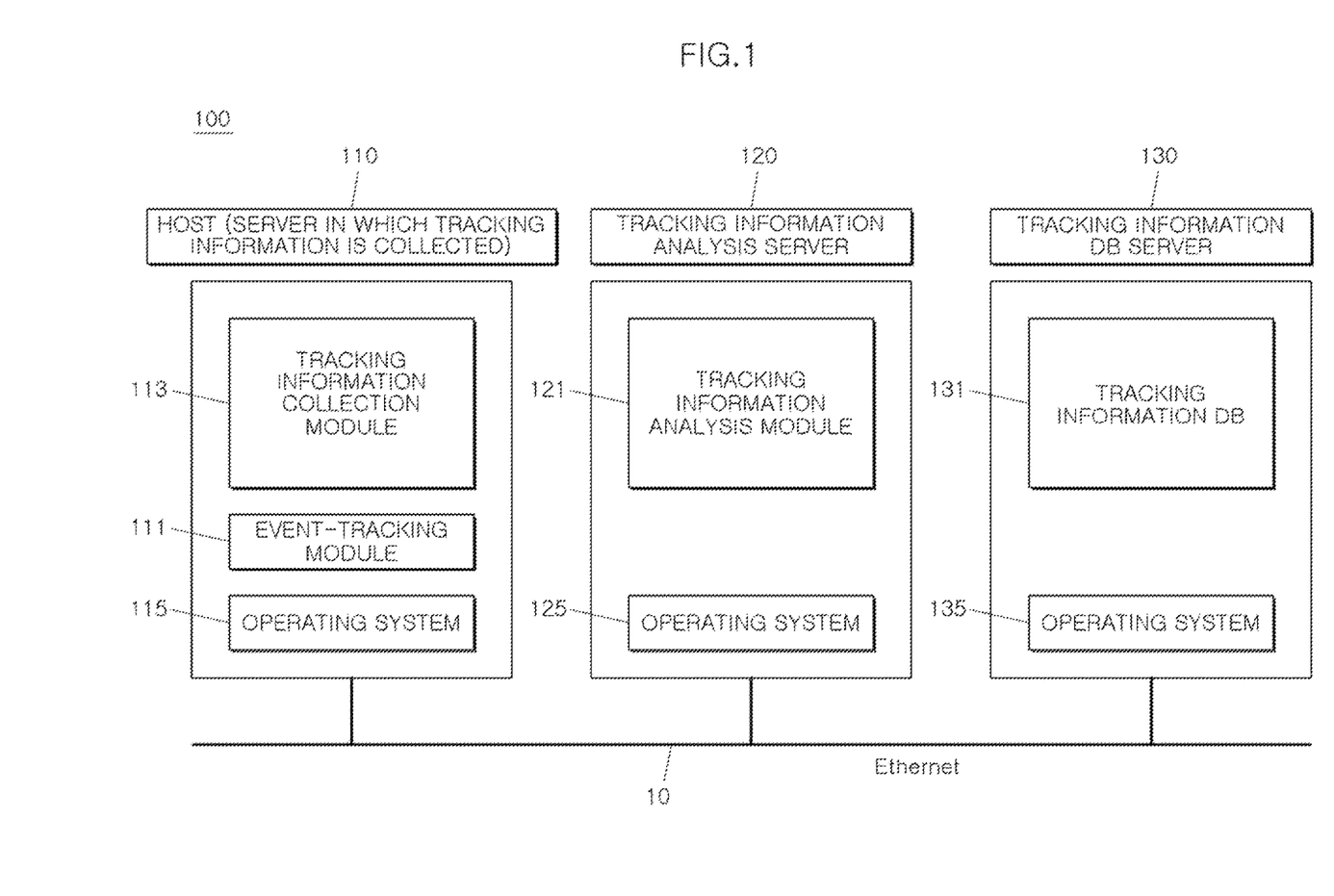
FIG. 1 is a block diagram illustrating an attack tracking system for automatically tracking a malware route and behavior in order to defend against cyberattacks according to an embodiment of the present invention.

FIG. 1 is a block diagram of an attack tracking system 100 for automatically tracking a malware route and malware behavior in order to defend against cyberattacks according to an embodiment of the present invention. Referring to FIG. 1, the attack tracking system 100 includes a host 110 for extracting only unit events that are necessary for tracking attacks from behavior events related to its system objects, a tracking information analysis server 120 for categorizing the unit events into influx, propagation, and execution so as to form a behavior event and for tracing an attack route by analyzing the correlation between the unit event and the behavior event, and a tracking information database (DB) server 130 for storing event information for tracking and the like. The host 110, the tracking information analysis server 120 and the tracking information DB server 130 are connected with each other using a communication line 10 such as Ethernet or the like. Here, the communication line 10 may be formed using a cable and/or in a wireless manner.

The host 110 serves to collect first event data concerning object behavior and to create multiple pieces of host-based event information using the first event data. In FIG. 1, although only a single host is illustrated for the convenience of description, the host may comprise multiple hosts.

The host 110 includes an event-tracking module 111 for tracking event data, a tracking information collection module 113 for collecting the tracked event data and thereby creating unit event information, an operating system 115 for operating the host 110, and the like. Here, the operation system may be UNIX, LINUX, WINDOWS or the like.

Here, the event-tracking module 111 may be an Event Trace for Windows (ETW), provided by Windows OS. Whenever a corresponding event occurs, the host 110 may store pieces of host-based event information in the tracking information DB server 130 in real time.

The tracking information analysis server 120 creates behavior events by defining malware behavior from the pieces of host-based event information. Also, based on a preset input value, the tracking information analysis server 120 searches the pieces of host-based event information and/or the behavior events for the target to be analyzed. Also, the tracking information analysis server 120 analyzes the relationship between the pieces of host-based event information corresponding to the target to be analyzed, and/or the relationship between a set of pieces of host-based event information and a set of behavior events, and thereby creates first tracking contexts, through which the malware behavior may be identified. Also, second tracking contexts, through which a malware route and/or behavior events between the multiple hosts may be tracked, may be created by analyzing the relationships between the first tracking contexts.

To this end, the tracking information analysis server 120 may include a tracking information analysis module 121 for tracking a malware route and/or malware behavior, an operating system 125 and the like.

The tracking information DB server 130 stores multiple pieces of host-based event information. To this end, the tracking information DB server 130 may include a tracking information DB 131 for storing the pieces of host-based event information, tracking information and the like, an operating system 135 and the like.

Figure 2:
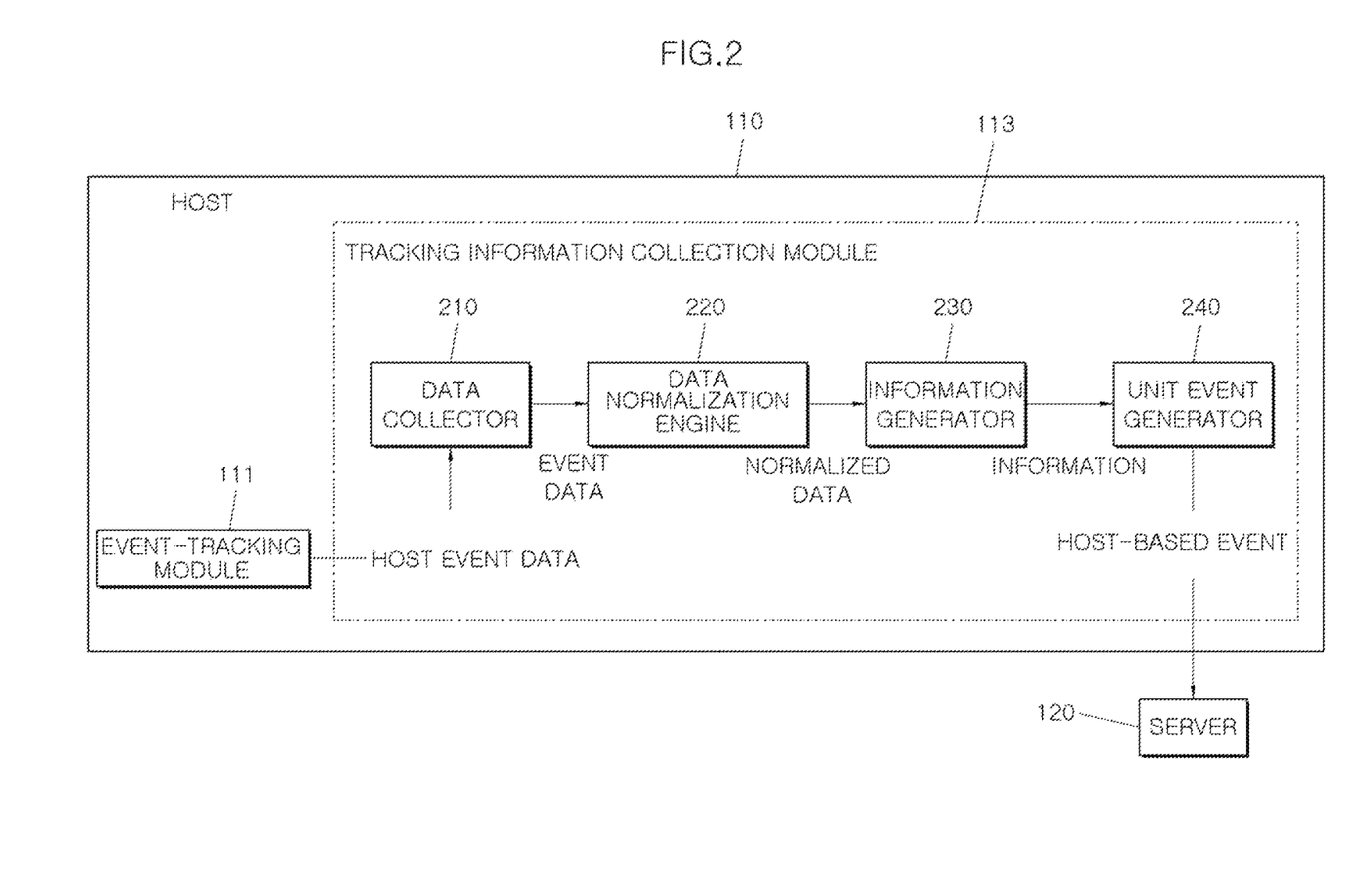
FIG. 2 is a block diagram that shows the configuration of the tracking information collection module illustrated in FIG. 1.

FIG. 2 is a block diagram that shows the configuration of the tracking information collection module 113 illustrated in FIG. 1. Referring to FIG. 2, the tracking information collection module 113 may include a data collector 210 for collecting event data from the event-tracking module 111, a data normalization engine 220 for generating normalized data using the event data, an information generator 230 for generating information data using the normalized data, a unit event generator 240 for generating a host-based event using the information data, and the like.

The data collector 210 serves to control the event-tracking module 111. Here, the event-tracking module 111 may be an Event Trace for Windows (ETW), provided by Windows OS. That is, the ETW is an event tracer provided by Windows OS, and object information required for analysis may be collected using the ETW. In order to collect ETW events, an ETW provider (for example, a process, a file, a registry, a network, a Plug and Play (PNP) system, and the like) is activated, and a real-time ETW session is started.

When an event from a designated provider occurs, the event-tracking module 111 collects events using event callbacks registered by the data collector 210. The raw data (data that are not processed) collected by the event-tracking module 111 have a format that is dependent on the version and architecture of the operating system.

The data normalization engine 220 receives the event data collected by the event-tracking module 111 and generates normalized data by processing the received data. This is intended to change the collected data (object information) having the format of ETW so as to have a data structure independent from the operating system and/or architecture in order not to be affected by the version of ETW or the version of the operating system, whereby the collected data may be changed so as to have a format available to an analysis tool. Then, the normalized data are put in the process queue of the information generator 230.

The information generator 230 tracks various unit events in real time, selects only unit events that are necessary for tracking attacks, tracks information about the related unit events, and thereby obtains additional information (for example, a process identifier (PID), a parent PID (PPID), a hash value of a file and the like). Here, because the additional information corresponds to volatile data, it cannot be used later for analysis. Therefore, it is necessary to convert the additional information into non-volatile data. Also, the information generator 230 delivers only data that satisfy a specified condition (a condition for data generation), among the data stored in the process queue, to the unit event generator 240.

The unit event generator 240 generates a host-based event by adding information about a host (for example, a Media Access Control (MAC) address, the name of the host and the like) to the tracked unit event. Also, the unit event generator 240 sends the host-based event and processes transmission errors. Also, the unit event generator 240 may use a scheduler function in order to effectively use the resources of the host (for example, a Central Processing Unit (CPU), memory and the like).

Figure 3A:
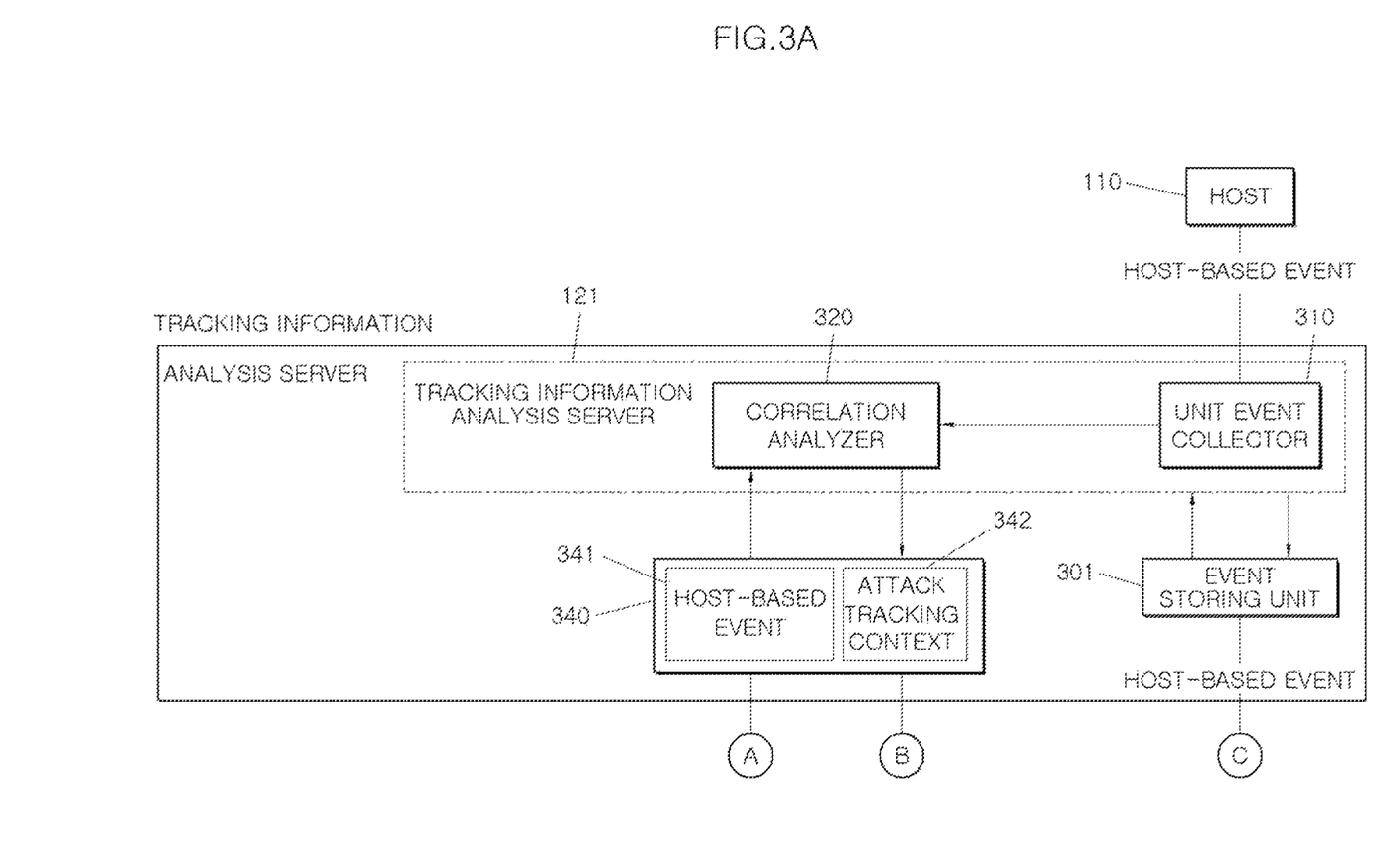
FIGS. 3A and 3B are block diagrams that show the configurations of the tracking information analysis server and the tracking information DB server illustrated in FIG. 1.
Figure 3B:
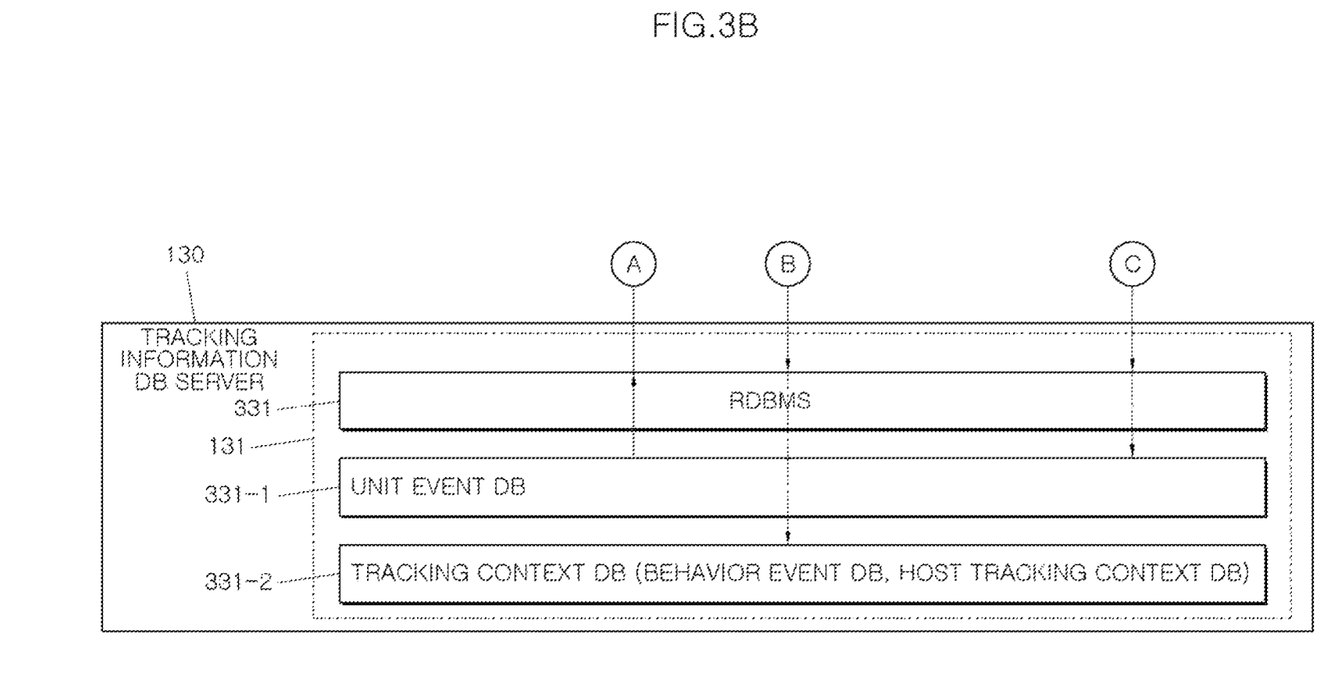

FIGS. 3A and 3B are block diagrams that show the configurations of the tracking information analysis server 120 and the tracking information DB server 130, illustrated in FIG. 1. Referring to FIGS. 3A and 3B, the tracking information analysis module 121 of the tracking information analysis server 120 may include a unit event collector 310 for collecting the created host-based events from the host 110, a correlation analyzer 320 for creating a behavior event by analyzing the correlation between the collected host-based events and for creating tracking contexts, through which a malware route and malware behavior inside the host may be tracked, using the created behavior events and host-based events, an event storing unit 301 for storing the host-based events in the tracking information DB 131, and a tracking information deliverer 340 for sending the host-based events 341, stored in the tracking information DB 131, to the correlation analyzer 320 and sending the tracking contexts 342 from the correlation analyzer 320 to the tracking information DB 131.

The unit event collector 310 stores the host-based events, received from the host 110, in the tracking information DB 131 of the tracking information DB server 130 via the event storing unit 301.

The tracking information DB server 130 may include a Relational Database Management System (RDBMS) 331. The RDBMS 331 may be implemented using Oracle Database, MySQL, Microsoft SQL Server, PostgreSQL, IBM DB2, or the like. The RDBMS 331 may include a unit event DB 331-1 for storing host-based events and the like, a tracking context DB 331-2 for storing tracking contexts and the like, and the like. Also, the tracking context DB 331-2 may include a behavior event DB, a host tracking context DB and the like.

Referring to FIGS. 3A and 3B, the event storing unit 301 may store all the host-based events therein using Syslog-NG daemon, which is a system log program. Accordingly, the event storing unit 301 executes the Syslog-NG daemon, and may then monitor whether the Syslog-NG daemon is being executed.

The correlation analyzer 320 analyzes the relationship between the collected host-based events using a correlation analysis function, and thereby generates a behavior event. Here, the behavior event represents a piece of information created by defining behavior such as the influx, execution, and propagation of malware by combining the host-based events. These may be referred to as an influx behavior event, an execution behavior event, and a propagation behavior event.

Among these behavior events, the influx behavior event may include an influx of malware through a web browser, an influx of malware through external storage media, an influx of malware through a network, an influx of malware through a patch program, an influx of malware through documents, and the like. Also, the execution behavior event may include registering malware so as to be automatically run, concealment of malware, and the like. Here, "concealment" may indicate storing data in the New Technology File System (NTFS), the Extended Attributes (EA) area, an unallocated area, a registry, or the like. Also, the propagation behavior event may be propagation via a network, propagation using external storage media, and the like.

The correlation analyzer 320 creates an intra-host tracking context (namely, the first tracking context), through which a malware route and malware behavior inside the host may be tracked, using the created behavior events and host-based events and analyzes the created intra-host tracking context. Also, the correlation analyzer 320 creates an inter-host tracking context (namely, the second tracking context), through which a malware route and malware behavior between the multiple hosts may be tracked, by analyzing the relationship between the created intra-host tracking contexts (which are the first tracking contexts) created in the multiple hosts 110.

Figure 4A:
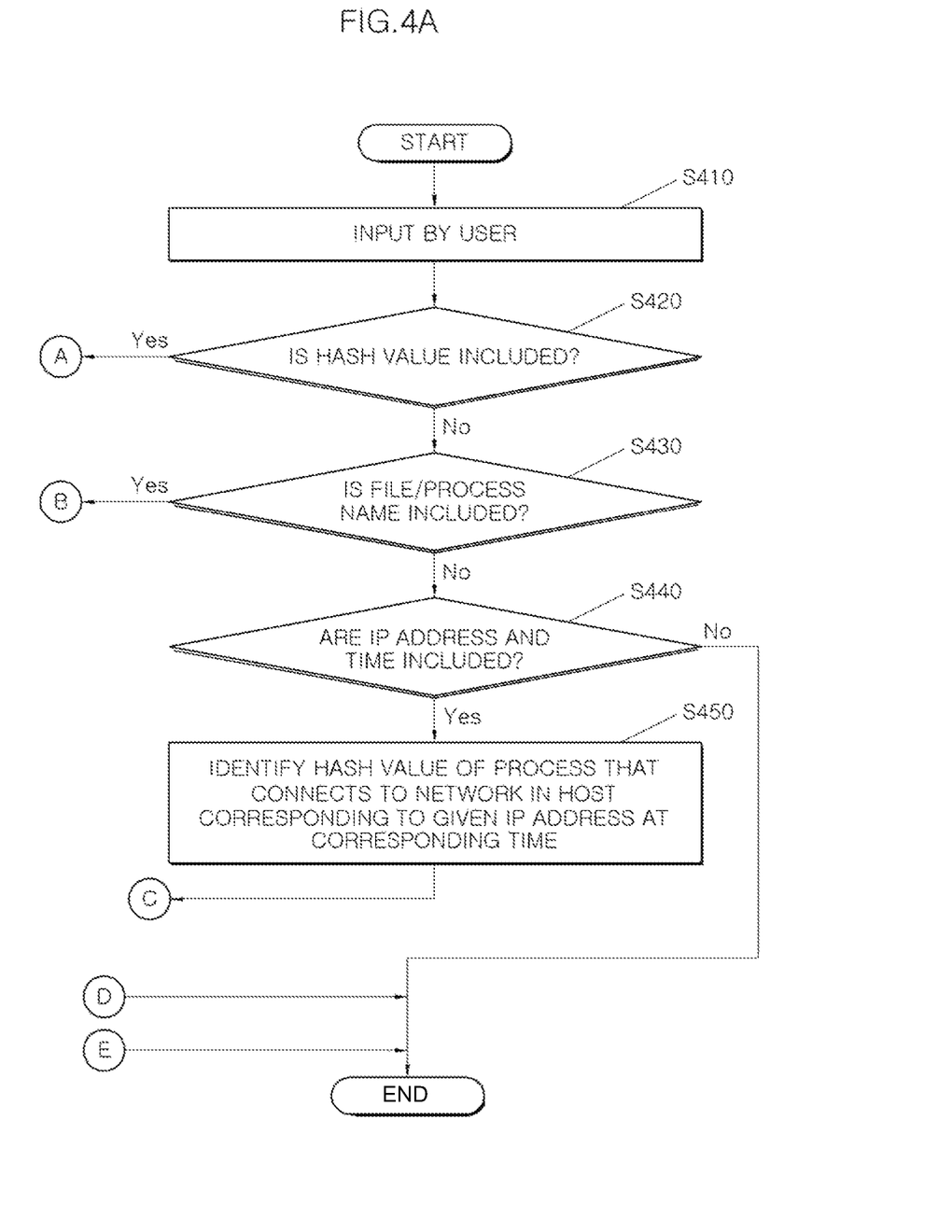
FIGS. 4A and 4B are flowcharts illustrating the process of identifying a file and/or a process corresponding to malware to be analyzed according to an embodiment of the present invention.
Figure 4B:
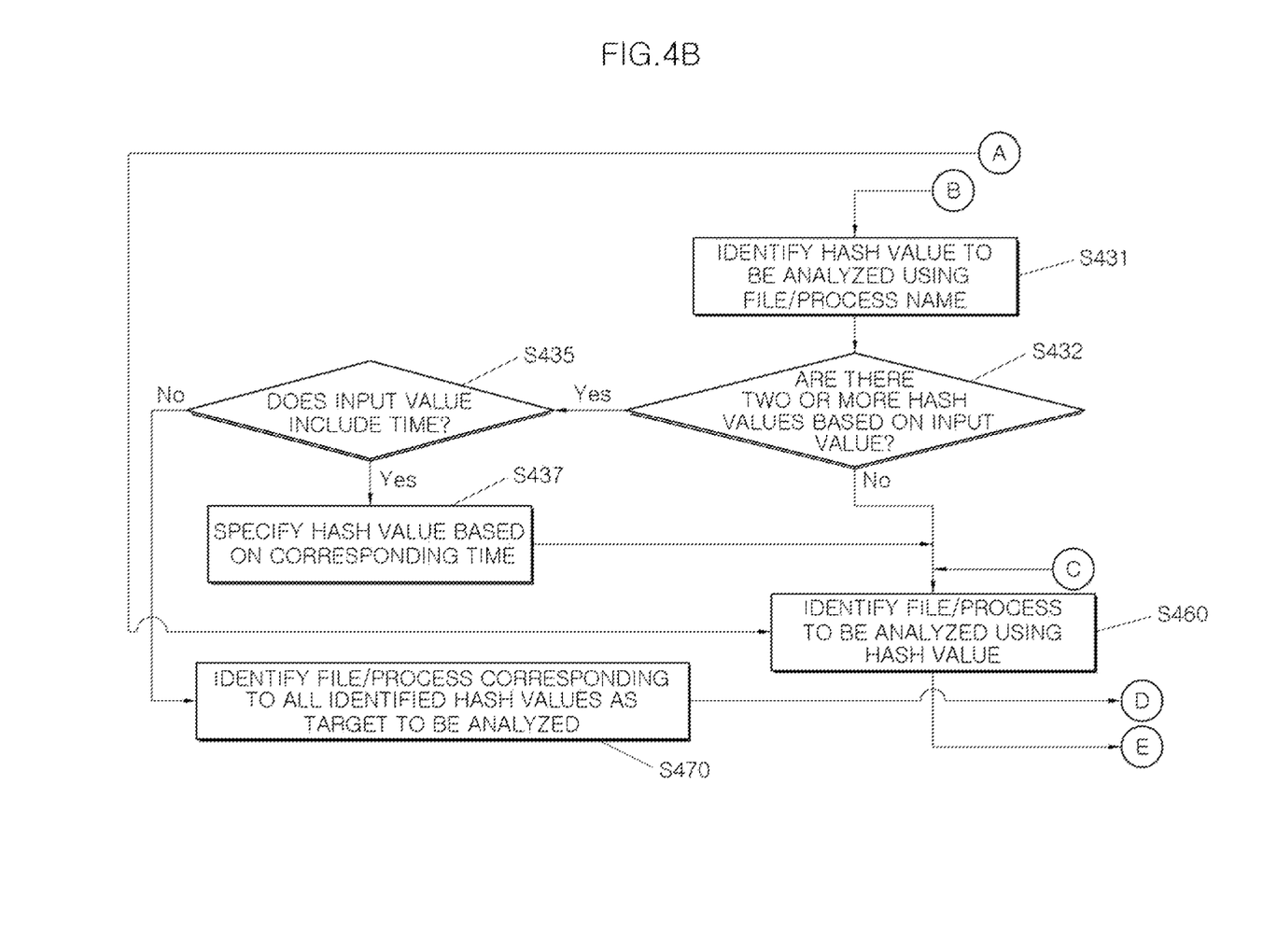

FIGS. 4A and 4B are flowcharts that shows the process of identifying a file and/or process corresponding to malware to be analyzed according to an embodiment of the present invention. Referring to FIGS. 4A and 4B, when an input value is created through user input, it is determined whether the input value includes a hash value of malware at steps S410 and S420. If it is determined that a hash value is present, a file or process to be analyzed is identified by analyzing the hash value at step S460.

Conversely, if it is determined at step S420 that the input value includes no hash value, whether the input value includes a file name or a process name is checked at step S430. If it is determined that the input value contains neither a file name nor a process name, whether the input value includes an Internet Protocol (IP) address and time is checked at step S440. At step S440, if the input value contains neither an IP address nor a time, the process is terminated. Conversely, at step S440, if the input value contains both an IP address and a time, the hash value of the process that connects to a network in the host corresponding to the given IP address at the corresponding time is identified, and a file and a process to be analyzed are specified using the identified hash value at step S460.

Meanwhile, when it is determined at step S430 that the input value includes a file name or a process name, a hash value for a target to be analyzed is identified using the file name or the process name at step S431, and then whether the identified hash value comprises two or more hash values based on the input value is checked at step S432.

If the hash value does not comprise two or more hash values at step S432, the file or process to be analyzed is identified by analyzing the hash value at step S460.

Conversely, if the hash value comprises two or more hash values, whether the input value includes a time is checked at step S435. If it is determined that the input value includes a time, a hash value is specified based on the corresponding time, and then a file or process to be analyzed is identified by analyzing the hash value at steps S437 and S460.

When it is determined at step S435 that the input value does not include a time, all of the files and processes corresponding to the two or more identified hash values are specified as the target to be analyzed at step S470.

Figure 5A:
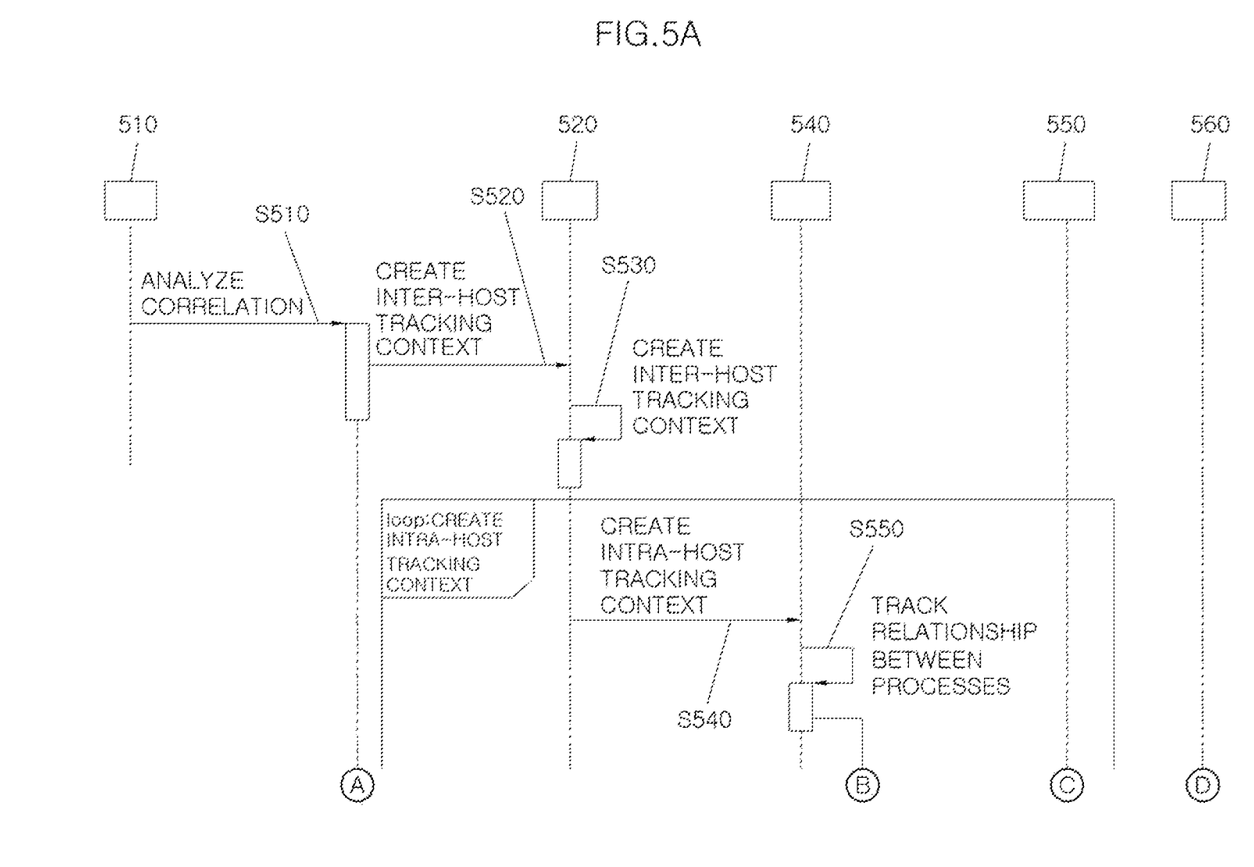
FIGS. 5A and 5B are flowcharts illustrating the process in which the correlation analyzer illustrated in FIG. 3, analyzes the tracking context in the host.
Figure 5B:
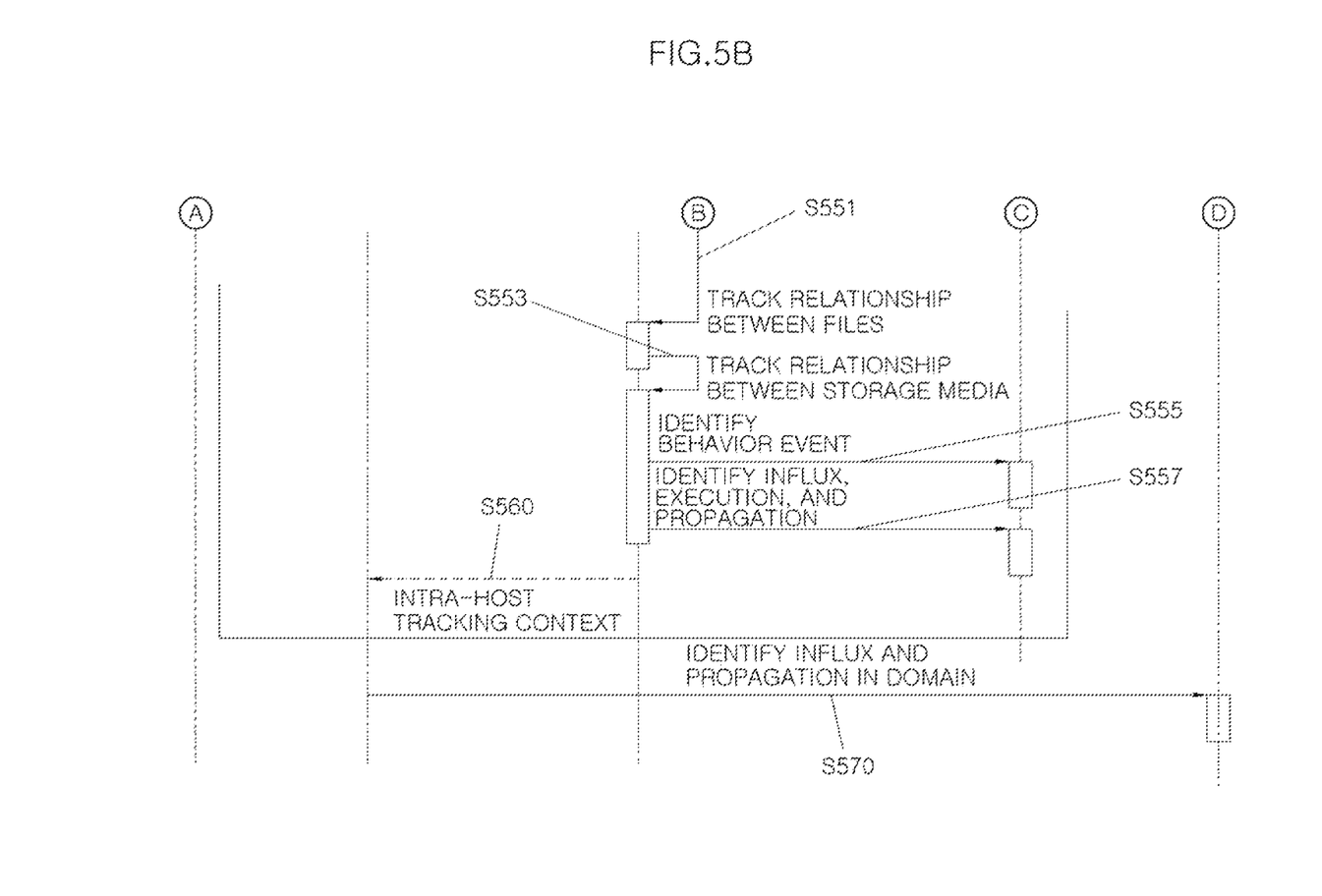

FIGS. 5A and 5B are flowcharts that shows the process by which the correlation analyzer 320 illustrated in FIG. 3A analyzes the intra-host tracking context. Referring to FIG. 5, when a request for analysis of a correlation is made in the analysis process 510 at step S510, a request for creating an inter-host tracking context is made at step S520.

Subsequently, an inter-host tracking context is created at step S530 and an intra-host tracking context is created at step S540 in the correlation analysis process 520 and the inter-host tracking context creation process 540. The intra-host tracking context (namely, the first tracking context) is created in such a way that information about an initial process is searched for based on the file and process, which are identified using the input value described with reference to FIGS. 4A and 4B, and the intra-host tracking context is created based on the found process-based events at step S540.

The first created intra-host tracking context has information only about the events for each process related to attack tracking. Here, when the relationship between processes is tracked, information about events of the parent process and child process of the identified process may be additionally collected. That is, through the process of tracking the relationship between the processes, not only the related process but also the relationship between the processes corresponding to the parent and child processes of the identified process may be tracked. The file-based events created by all the parent and child processes of the identified process are searched for and added in the intra-host tracking context.

Specifically, in the process 550 of analyzing the correlation inside the host, the paths of all of the identified processes and files on a disk are analyzed, whereby whether the paths of the corresponding file and executable image indicate the paths on an external storage medium or network storage is checked, and the results are added in the intra-host tracking context at steps S550, S551, S553, S555, and S557.

In the correlation analysis process 520, when all of the unit events necessary for analysis have been collected, the relationship between the unit events is analyzed, whereby a behavior event is identified. Here, a behavior event is defined as meaningful behavior necessary for tracking, and a single behavior event may be configured to include one or more unit events. That is, a single behavior event is created by combining the relationships between one or more unit events, and various data that form the behavior event are extracted from the unit events.

Each of the identified behavior events has its own categorization information, and information related to influx, execution, and propagation may be included therein. By analyzing the correlation between the behavior event and the unit event, the influx, execution, and propagation behavior in the host may be identified.

When the intra-host tracking context to which the tracking result has been added is created, the influx, execution, and propagation inside a domain are identified at step S557 in the process 560 of analyzing the correlation inside a domain. Specifically, the intra-host tracking contexts in which the tracking result was added are inserted into the inter-host tracking context, whereby the correlation in the domain is analyzed.

Figure 6:
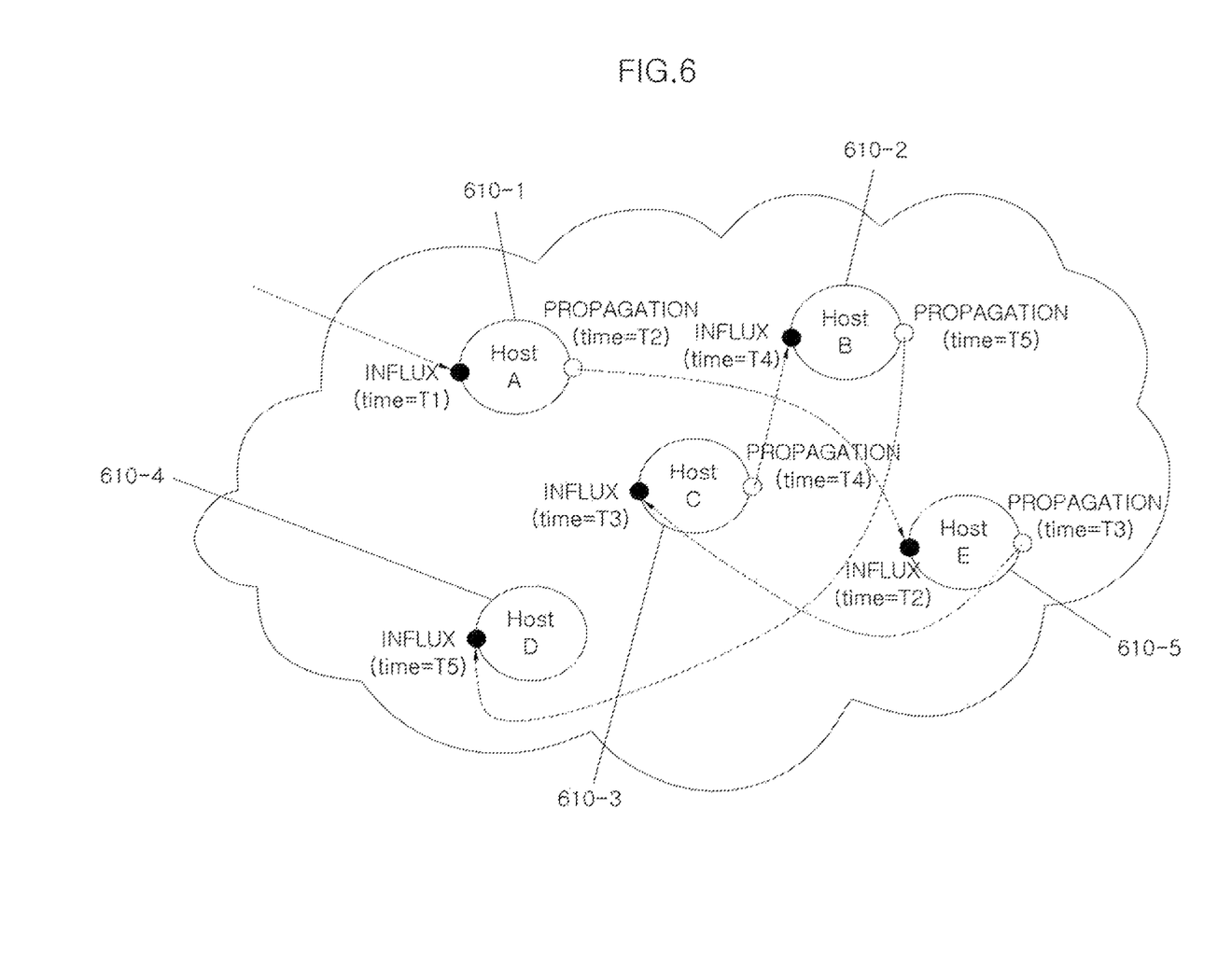
FIG. 6 is a concept diagram that shows the process in which the correlation analyzer illustrated in FIG. 3A, creates a tracking context between hosts for the first identified host.

FIG. 6 is a concept diagram that shows an example in which the correlation analyzer 320, illustrated in FIGS. 3A and 3B, creates an inter-host tracking context for the first identified host. Referring to FIG. 6, the influx and propagation information is checked in the intra-host tracking context of each of the hosts 610-1 to 610-5, in which the analysis process is completed, in the domain, and the hosts having the same influx and propagation information are connected with each other (marked with dotted lines).

Terms such as "unit", "module" and the like used herein may mean a unit for processing at least one function or operation. Also, "unit", "module" and the like may be implemented as hardware and/or software. Hardware may be implemented using a hardware component designed in order to perform the above-described functions, such as an Application Specific Integrated Circuit (ASIC), a Digital Signal Processing (DSP), a Programmable Logic Device (PLD), a Field Programmable Gate Array (FPGA), a processor, a controller, a microprocessor and another electronic unit or a combination thereof. Also, software may be implemented as a module for performing the above-described functions. Software may be stored in a memory unit and executed by a processor. Here, the memory unit and the processor may use various units that are well known to those skilled in the art.

According to the present invention, because the collection of data that are necessary for analysis is automated, the arbitrary elimination of data by attackers or the deletion of data due to the limited capacity of log storage may be minimized.

Also, according to the present invention, collection of data is easily performed by providing a function of integrated collection of data necessary for analysis in a host, rather than providing a tool for collecting individual artifacts.

Also, according to the present invention, because data may be collected from multiple hosts simultaneously, time and/or labor costs required for data collection may be minimized.

Also, according to the present invention, because an investigation and analysis process for analyzing intrusion incidents is automated, it is possible to overcome the limitation of existing forensic technology, in which information (data) acquired by merely parsing data is provided to security specialists.

Also, according to the present invention, steps that have to date been performed by security specialists, which include the identification of behavior events by analyzing the correlation of information (data), the identification of malicious behavior events such as the influx, execution, and propagation of malware in a host, the detection of a route and method through which malware migrates within a domain, the detection of the execution of malware, and the like, may be automated.

Also, because the present invention provides basic infrastructure technology that is systematic and easy to use in order to respond to intrusion incidents, reliance on the experience and knowledge of security specialists may be minimized, and it is possible to quickly and effectively respond to intrusion incidents.

What is claimed is:

1. A system for tracking a malware route and behavior in order to defend against cyberattacks, comprising:
    multiple hosts in which first event data concerning object behavior are collected and pieces of host-based event information are created using the first event data;
    a tracking information database server for storing the pieces of host-based event information therein; and
    a tracking information analysis server for creating behavior events by defining malware behavior from the pieces of host-based event information, for searching the pieces of host-based event information and the behavior events for a target to be analyzed based on a preset input value, for creating first tracking contexts, through which the malware behavior is capable of being identified, by analyzing a relationship between the pieces of host-based event information and a relationship between a set of the pieces of host-based event information and a set of the behavior events, which correspond to the target to be analyzed, and for creating second tracking contexts, through which a malware route and behavior events between the multiple hosts are capable of being tracked, by analyzing a correlation between the first tracking contexts,
    wherein the first tracking contexts are tracking contexts inside at least one of the multiple hosts, and the second tracking contexts are tracking contexts between the multiple hosts.

2. The system of claim 1, wherein each of the multiple hosts includes:
    an event-tracking module for, tracking the event data; and
    a tracking information collection module for creating unit event information by collecting the tracked event data.

3. The system of claim 2, wherein the tracking information collection module includes:
    a data collector for creating second event data from the first event data;
    a data normalization engine for creating normalized data by normalizing the second event data;
    an information generator for extracting data necessary for tracking from the normalized data and obtaining related additional information from the extracted data, thereby generating information data; and
    a unit event generator for generating a host-based event by adding information about a host in which an event occurs to the information data.

4. The system of claim 3, wherein;
    the additional information includes at least one of parent file information, process information, a file hash value, Internet Protocol (IP) address information, and time information, and
    the information about the host includes at least one of a Media Access Control (MAC) address and a name of the host.

5. The system of claim 2, wherein the event-tracking module is an Event Trace for Windows (ETW), and the pieces of host-based event information are stored in the tracking information database server in real time whenever a corresponding event occurs.

6. The system of claim 1, wherein the malware behavior is one of an influx of malware, execution of malware, and propagation of malware.

7. The system of claim 1, wherein the target to be analyzed is at least one of the corresponding host, a malware file, and a malware process.

8. The system of claim 1, wherein the second tracking contexts are created by identifying at least one of an entry point via which malware enters a domain, a route via which the malware migrates, and a route via which the, malware propagates by analyzing the correlation between the first tracking contexts.

9. The system of claim 8, wherein at least one of the entry point via which malware enters a domain, a route via which the malware migrates, and a route via which the malware propagates is identified using a collection of Internet Protocol (IP) addresses, which are created as a result of identifying at least one of an influx of malware into a host, execution of malware, and propagation of malware for each host in a list of hosts suspected of being infected with malware or using execution of malware in the domain based on an execution analysis result in the multiple hosts.

10. The system of claim 9, wherein:
    if at least one of the entry point via which malware enters the domain, a route via which the malware migrates, and a route via which the malware propagates is not identified using the collection of IP addresses, an additional list of hosts suspected of being infected with malware is acquired by searching for the behavior events collected inside the domain using a file name that is used for the influx of malware to the host in the list or the propagation of malware, and at least one of the entry point via which malware enters the domain, a route via which the malware migrates, and a route via which the malware propagates is identified using the additional list, wherein the file name is obtained as an analysis result.

11. The system of claim 1, wherein the piece of host-based event information includes at least one of creation of a file, deletion of a file, reading a file, copying a file, a start of a process, termination of a process, reading a process, reading a registry entry, writing data in a registry, deletion of a registry entry, a request for access to a network, permission for access to a network, a request for a connection to an external storage medium, permission for a connection to an external storage medium, writing data in a Master Boot Record (MBR) area, and writing data in a Volume Boot Record (VBR) area, or parent information thereof.

12. The system of claim 1, wherein the first tracking contexts are created in such a way that:
    a list of hosts suspected of being infected with malware in a domain is acquired;
    a first behavior event related to the malware behavior, among the pieces of host-based event information and the behavior events for each of the hosts in the list, is identified; and
    a second behavior event is identified based on a unit/behavior event concerning a main object related to the first behavior event.

13. The system of claim 12, wherein the main object includes a file and a process.

14. A method for tracking a malware route and behavior in order to defend against cyberattacks, comprising:
- collecting, by multiple hosts, first event data concerning object behavior and creating, by the multiple hosts, pieces of host-based event information using the first event data;
- storing, by the multiple hosts, the pieces of host-based event information in a tracking information database server;
- creating, by a tracking information analysis server, behavior events by defining malware behavior from the pieces of host-based event information;
- retrieving, by the tracking information analysis server, a target to be analyzed from the pieces of host-based event information and the behavior events based on, a preset input value;
- creating, by the tracking information analysis server, first tracking contexts, through which the malware behavior is capable of being identified, by analyzing a relationship between the pieces of the host-based event information and a relationship between a set of the pieces of the host-based event information and a set of the behavior events; and
- creating, by the tracking information analysis server, second tracking contexts, through which a malware route and behavior events between the multiple hosts are capable of being tracked, by analyzing a correlation between the first tracking contexts,
- wherein the first tracking contexts are tracking contexts inside at least one of the multiple hosts, and the second tracking contexts are tracking contexts between the multiple hosts.

* * * * *